United States Patent [19]

Fitzpatrick

[11] 4,044,723
[45] Aug. 30, 1977

[54] ANIMAL FEEDING APPARATUS

[76] Inventor: Robert E. Fitzpatrick, 27 Lyle Terrace, Malden, Mass. 02148

[21] Appl. No.: 719,612

[22] Filed: Sept. 1, 1976

[51] Int. Cl.² ............................................. A01K 5/00
[52] U.S. Cl. .................................... 119/61; 119/51.5; 248/154
[58] Field of Search .......................... 119/61, 51, 51.5; 248/154, 310, 311.1, 500; 108/26, 26.2, 25; 297/188

[56] References Cited

U.S. PATENT DOCUMENTS

| | | | |
|---|---|---|---|
| 95,280 | 9/1869 | Spaulding | 119/61 |
| 1,277,838 | 9/1918 | Billard | 248/154 X |
| 1,831,593 | 11/1931 | Garvey | 119/61 |
| 2,865,697 | 12/1958 | Staley | 108/25 |
| 3,651,787 | 3/1972 | Cooper | 119/61 X |

FOREIGN PATENT DOCUMENTS 1,187,812 1959 France .................................... 119/61

Primary Examiner—Jay N. Eskovitz
Attorney, Agent, or Firm—Munroe H. Hamilton

[57] ABSTRACT

An animal feeding apparatus particularly suitable for feeding large dogs such as Great Danes, includes a table having angularly disposed legs which support the table top in a substantially braced position above a floor surface and at a feeding level which may be chosen with reference to the normal height of the animal to be fed. Container means located in the table top provides for holding a serving of dog food in a raised position. A cover element is formed with hinge means along one edge of the table top and is movable into a position to overlie the top. The cover element is recessed to receive the container means therethrough in an upwardly projecting position when the cover is closed, and portions of the container means are engaged between the cover and top so that no displacement of the container means takes place during the feeding period.

2 Claims, 3 Drawing Figures

ANIMAL FEEDING APPARATUS

BACKGROUND OF THE INVENTION

In the art, it is well known to provide feeding utensils which may be secured in a fixed position as shown in the Staley Pat. No. 2,865,697 wherein a means for securing a baby's dish is disclosed. It has also been proposed to provide a dog pan which may be held in a support described in Gillespie, U.S. Pat. No. 3,121.419. With the latter device, feeding takes place at floor level, and it has been found by veterinarians experienced in the care and treatment of dogs such as Great Danes that it may be injurious to the animal's health to eat from a feeding pan at floor level.

SUMMARIZATION OF THE INVENTION

The present invention is concerned with improved animal feeding apparatus and it is a chief object of the invention to devise an animal feeding means which may be adapted to the height of the animal and which may be held in a firmly braced position to prevent container means from being moved about over a floor surface.

With these objectives in mind there has been devised an animal feeding apparatus which includes a table member supported on legs chosen of a size suitable for locating the top of the table at any desired height, and particularly, a height suited to a relatively large animal of the dog family such as a Great Dane. Container means located on the table top provides for holding a serving of dog food in a raised position, and in combination with the container means is provided a locking cover element which is secured along one edge of the table top by means of hinges. The cover element is recessed to receive the container means therethrough in an upwardly projecting position when the cover is closed, and outer rim or flange portions of the container means are engaged between the cover and table top so that no displacement of the container means takes place during the feeding period.

DETAILED DESCRIPTION OF THE INVENTION

Figure 1:
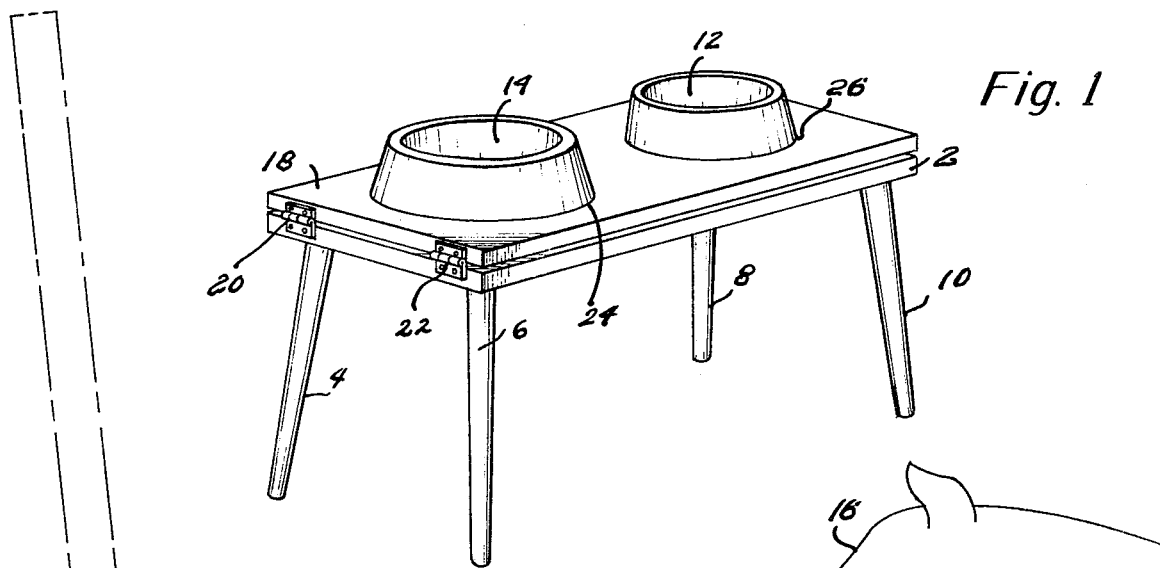
FIG. 1 is a perspective view illustrating the animal feeding apparatus of the invention.

Referring in more detail to the apparatus illustrated, numeral 2 denotes a table top which is generally rectangular in shape and may be constructed of wood, plastic or other desired material. The size of the table top may vary in accordance with the size of a food container to be supported at the upper side thereof, and in one preferred form, may be of a width sufficient to support a conventional dog feeding pan used in feeding a large dog such as a Great Dane.

The table top is supported on legs 4, 6, 8 and 10, preferably located in outwardly angled positions to provide for maintaining the table top in a substantially braced position which tends to resist sliding over a floor surface. The legs may be fixed or detachably secured at the underside of the table, and if desired, may be furnished in sets occurring with differing lengths so that the feeding level may be adjusted as required. Likewise, the legs may, if desired, be constructed with telescoping tubular sections which can be adjusted to change the table height as required.

Numeral 12 denotes a container or pan of the class customarily sold by pet shops for use in holding a serving of dog food, for example, and as indicated, is of annular shape with outwardly sloping sides, 12a, which terminate in an outer projecting rim or flange, 12b. For some purposes the use of the single pan 12 may be satisfactory, but in a preferred embodiment of the invention, there may be included a second container 14. This second container may, for example, be used to hold a supply of drinking water, milk, or other liquid, and container 14 may be formed with sloping sides 14a and an outer projecting rim or flange 14b.

Figure 2:
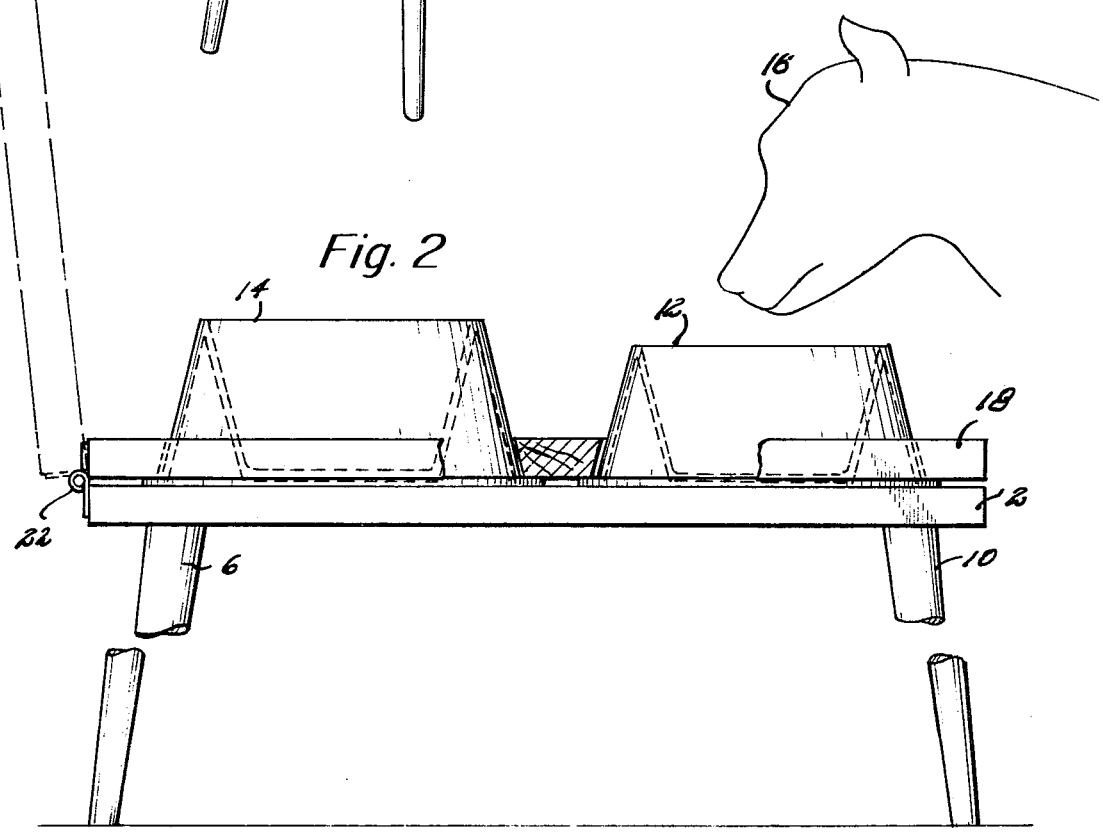
FIG. 2 is a side elevational view showing a table top and container means in a typical feeding position with the head of a dog of the Great Dane breed indicated diagrammatically.
Figure 3:
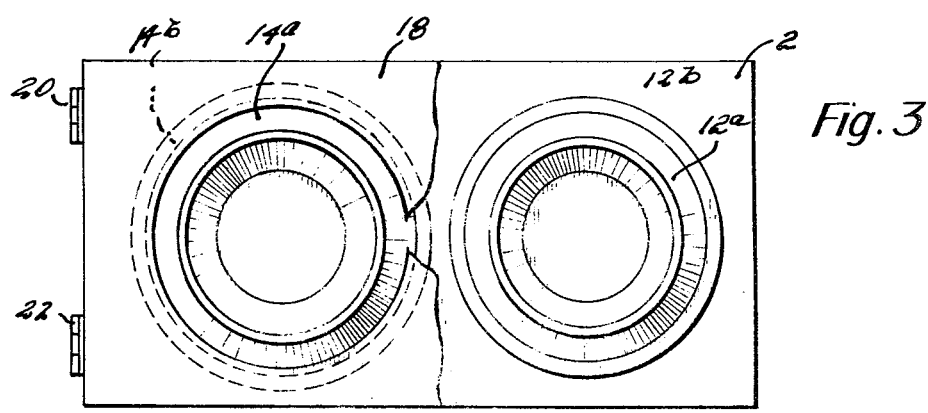
FIG. 3 is a plan view indicating a cover member partly broken away to show the table top with container means supported thereon.

In FIG. 2 a head 16 of a Great Dane is indicated diagrammatically at a normal feeding level recommended by veterinarians, and the table top and containers 12 and 14 are also shown in a position to hold the containers conveniently placed for this recommended feeding level.

In combination with the table top 2, I further provide cover means for releasably holding the containers 12 and 14 in a position to resistant displacement when feeding occurs. This cover element is denoted by the numeral 18 and is secured along one edge of the table top 2 by a pair of hinge members 20 and 22 which provide for hinging movement of the cover 18.

Intermediate portions of cover 18 are recessed to provide a pair of circular openings 24 and 26 which are made of a size such that the containers 12 and 14 may, in a closed position of the cover 18, project upwardly therethrough, as suggested in FIG. 1. The arrangement of parts is such that the circular edge portions of the openings 24 and 26 fit over and engage against the flanges 12b and 14b to thus releasably hold the containers in place. To remove the containers from the table top the cover 18 is swung back into a raised position as shown in broken lines in FIG. 2.

In making the feeding apparatus of the invention, I may modify the construction in several respects by utilizing adjustable legs, as earlier noted. Also, I may employ other forms of retaining means for holding the containers in a fixed position on a table which is elevated above floor level, and the retaining means may be secured to the table top section at any desired point inside of its edges.

I claim:

1. A dog feeding apparatus comprising a table member having a top section of rectilinear shape and a plurality of legs attached to the underside of the top section for supporting said top section in a horizontally disposed position and at a raised feeding level recommended by veterinarians for feeding large dogs of the mastiff breed, said legs being arranged in angularly opposed relationship at two opposite ends of the top section and projecting outwardly to encompass a floor area greater than the area of the top section and to resist overturning during a feeding by a large dog of the mastiff breed, container means slideably disposed at the upper section of the top section, said container means including inner generally circular food receptacle means and outwardly tapering side portions terminating in bottom flange portions, a cover member, hinge means for attaching the cover at one of said ends of the top section, said cover having a rectilinear shape which is the same as the shape of the top section and being recessed to form circular aperture means through which the container means may be received when the cover is closed, the axes of turning of the hinge means lying in a plane above the upper surface of the top section to position the cover when closed firmly against the container flange means.

2. The invention of claim 1 in which the cover is located in parallel spaced relation to the top section to overlie and protectively shelter the upper surface of the top section, and said circular aperture means having undercut edge portions which fit around adjacent tapered surfaces of the side portions to releasably secure the container means in a fixed position while preventing passage of food onto the top section.

* * * * *